United States Patent [19]

Napolitano et al.

[11] 4,178,960
[45] Dec. 18, 1979

[54] RESETTABLE PRESSURE RESPONSIVE VALVE

[75] Inventors: Joseph J. Napolitano, Paramus; Michael Richardson, Paterson, both of N.J.

[73] Assignee: Auto Research Corporation, Oakland, N.J.

[21] Appl. No.: 801,201

[22] Filed: May 24, 1977

[51] Int. Cl.² .............................................. F16K 31/12
[52] U.S. Cl. .................................... 137/494; 137/467
[58] Field of Search ............................... 137/494, 467

[56] References Cited

U.S. PATENT DOCUMENTS

| 1,891,119 | 12/1932 | Stover | 137/467 |
| 3,203,246 | 8/1965 | Horwitt | 137/494 X |
| 3,409,037 | 11/1968 | Nelson | 137/467 X |
| 3,592,222 | 7/1971 | Gross | 137/467 |
| 3,780,759 | 12/1973 | Yahle | 137/467 |
| 4,015,627 | 4/1977 | Bower | 137/467 X |

FOREIGN PATENT DOCUMENTS 303696 12/1932 Italy ........................................ 137/467

Primary Examiner—Harold W. Weakley
Attorney, Agent, or Firm—Ostrolenk, Faber, Gerb & Soffen

[57] ABSTRACT

Pressure responsive piston valve with spring controlled detent balls; a detent pressure spring extends longitudinally through the piston and urges a biasing ball against detent balls which are longitudinally offset from the biasing ball; the detent balls are driven into a detent groove in the cylinder for the piston; pressure on the piston forces the detent balls out of the detent groove; calibrating means for the spring.

16 Claims, 5 Drawing Figures

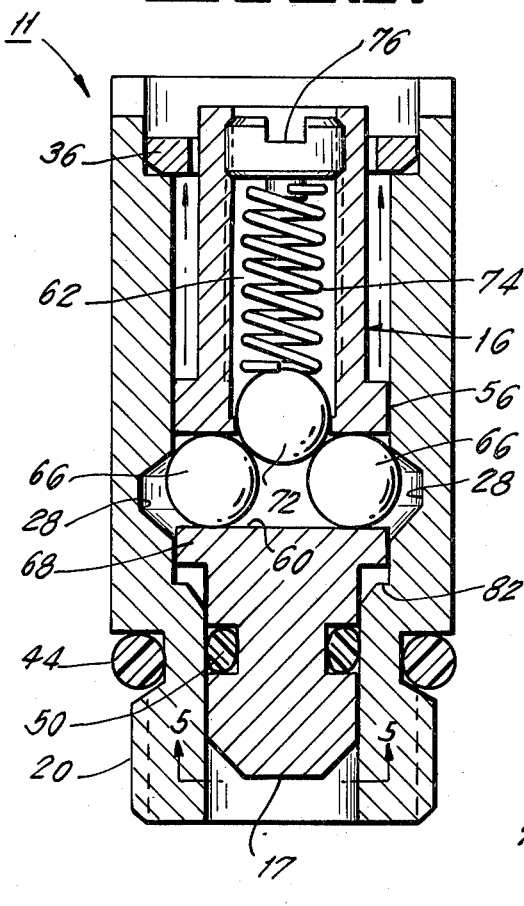
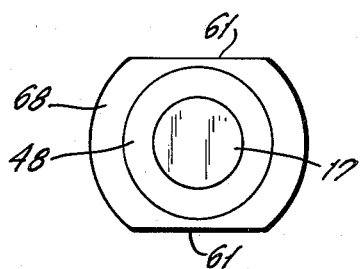
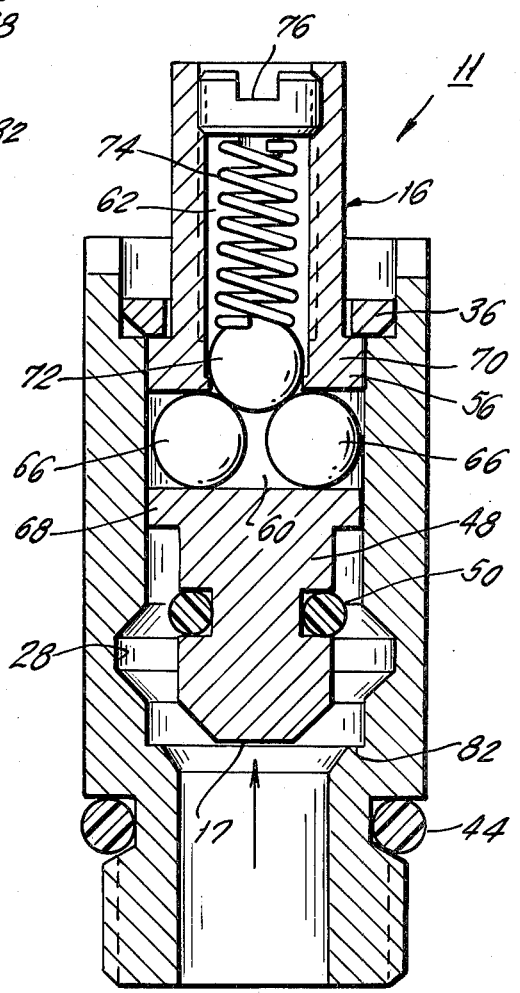

RESETTABLE PRESSURE RESPONSIVE VALVE

FIELD OF THE INVENTION

This invention relates to a pressure responsive valve and, in particular, relates to such a valve incorporated in a fluid distribution system, wherein the valve may provide relief for excess pressure and may also provide an indicator of such excess pressure.

BACKGROUND OF THE INVENTION

Pressure responsive valves in liquid distribution systems can monitor the flow of the liquid and can particularly detect blockages, leaks and pressure variations.

One device for detecting excessive pressure increase is the secondary valve 72 described in U.S. Pat. No. 3,730,297 issued May 1, 1973 to Francis E. Colgan, entitled "Liquid System Function Indicator," and assigned to the assignee hereof. This valve includes a sealed piston in fluid communication with the distribution system and which is restrained against shifting by a wire having a predetermined burst pressure. The piston has a knife edge that bears upon the wire and that eventually cuts the wire when the pressure in the distribution system increases beyond the burst pressure of the wire. The difficulties with this valve are that it is not reusable and must be replaced after use, that it may not be adjusted and that it may be tested only by destructive testing.

Other pressure detecting devices include detent means for restraining a control valve, as described in U.S. Pat. No. 3,088,489. In the device of this patent, a longitudinally extending spring biases a longitudinally movable camming cone to urge detent balls into registered detent notches in the piston and the cylinder. This detent means positions the piston longitudinally along the cylinder. Excess pressure drives the piston and its camming cone to release the balls from the detent notches, whereby the piston moves under pressure. One limitation of this device is that the biasing force of the spring upon the piston cannot be adjusted without dismantling the entire valve. For other detent devices, see U.S. Pat. Nos. 3,685,813 and 3,218,882.

BRIEF DESCRIPTION OF THE INVENTION

The present invention provides a reusable, bistable pressure responsive valve for a liquid distribution system. The valve remains completely closed until its piston shifts and then it opens completely. Hence it is bistable. The valve responds to the occurrence of excess pressure in the system. The valve has particular application to a lubricant distribution system, like that disclosed in U.S. Pat. No. 3,730,297, although it is not limited to such an application.

The valve of the invention comprises a cylinder having a movable piston in it and associated with a detent mechanism. The detent mechanism includes a recess, preferably annular, in the cylinder and facing radially inwardly toward the surface of the piston. This recess may have chamfered walls at its longitudinal ends. The cylinder has a narrower width bore at one side of its chamfered recess and a wider bore at the other side of that recess. The cylinder is arranged with the narrower width side facing into the distribution system.

The piston has at least one radially inwardly extending opening which is opposable to the chamfered recess in the cylinder as the piston is moved through the cylinder. In the preferred version, the radial opening in the piston is comprised of a transverse bore extending completely across the piston defining two longitudinally aligned radial passages opposable to the cylinder recess.

The piston has different characteristics at opposite longitudinal sides of the transverse bore. On the side in the narrower width section of the cylinder, the piston seals in the cylinder. At the side in the wider section of the cylinder, the piston is shaped to permit liquid to escape past the piston and out the cylinder.

A respective radially shiftable detent element, preferably in the shape of a ball, is captured between the chamfered recess of the cylinder and each radial opening of the piston. In the preferred version, there are two detent elements, one placed at each end of the bore extending across the piston. As the piston moves, the detent elements move into and out of the chamfered recess while remaining at the mouths of the radial openings of the piston. The below described biasing element urges the detent elements continuously into the cylinder recess.

The piston is shaped so that with the detent elements in the cylinder recess, the piston seals the narrower width section of the cylinder and blocks leakage flow from the liquid system out the cylinder. Once the system pressure has overcome the force of the biasing element and forced the detent elements out of the cylinder recess, the piston part that had sealed in the narrower width section of the cylinder bore moves into the wider section of the cylinder bore and the seal ends. Liquid from the system can now flow past the piston and out of the unsealed cylinder.

There is a longitudinally movable biasing element supported by the piston which is urged longitudinally with respect to the piston into engagement with the detent elements to normally bias those elements into the recess of the cylinder. In the preferred embodiment, there is a longitudinally extending bore in the piston that intersects the transverse, radially extending bore. The detent elements are positioned off the longitudinal axis of the longitudinal bore of the piston toward the sides of the piston. The biasing element, preferably also in the shape of a ball, is carried in the longitudinal bore of the piston and is biased to bear against the detent elements to urge them radially outwardly and into the cylinder recess when that recess is opposed to the radial openings from the transverse piston bore. In the preferred arrangement, which includes two detent elements at the ends of the transverse piston bore, the biasing element projects partially between the two detent elements preventing their movement toward each other and out of the cylinder recess.

Biasing spring means normally urges the biasing element against the detent elements. In the preferred arrangement, the spring is in the piston longitudinal bore and is charged by compression to urge the biasing element against the detent elements. This spring can be calibrated so as to adjust the piston to respond to different system pressures.

When the longitudinally directed system pressure on one end of the piston exceeds a predetermined level, the force on the piston overcomes the biasing force exerted by the spring against the biasing element and the detent elements and the detent elements move out of the cylinder recess, freeing the piston to shift through the cylinder. The fluid pressure against the end of the piston now drives it rapidly through the cylinder, and an end portion of the piston extends outside the cylinder. This projecting end portion can serve as one indication of the occurrence of excess pressure. Another indication would be the leakage flow from the cylinder. The valve may thereafter be reset by manually returning the piston to its original position in the cylinder, and the detent elements will be again urged into the cylinder recess.

Accordingly, it is an object of the present invention to provide an improved hydraulic valve that is pressure responsive and that is useful in detecting predetermined excesses of pressure in liquid distribution systems.

It is another object of the invention to provide such a valve having a pressure responsiveness that is adjustable.

It is a further object of the invention to provide such a valve that is reusable.

It is another object of the invention to provide such a valve that can be tested without impairment.

It is yet another object of the invention to provide such a valve which is bistable.

A further object of the present invention is to provide such a valve, having a stationary cylinder and a pressure sealed movable piston within it, wherein the pressure sealed piston is restrained against free movement until a selected excess pressure is applied to the piston.

A still further object of the present invention is to provide such valve which will provide visual indication of the fact that its piston has shifted.

Other objects and features of this invention will be apparent from the following description taken in conjunction with the accompanying drawings which detail a preferred embodiment of the invention.

BRIEF DESCRIPTION OF THE DRAWINGS

FIG. 3 is a view corresponding to that of FIG. 2 showing an instantaneous condition of the valve at its initial response to excessive pressure;

FIG. 4 is a view of the valve of the same type illustrated in FIG. 2 but with the valve in an open position; and FIG. 5 is an end view of the piston of the valve in the direction of the arrows 5—5 of FIG. 3.

DETAILED DESCRIPTION OF A PREFERRED EMBODIMENT

Figure 1:
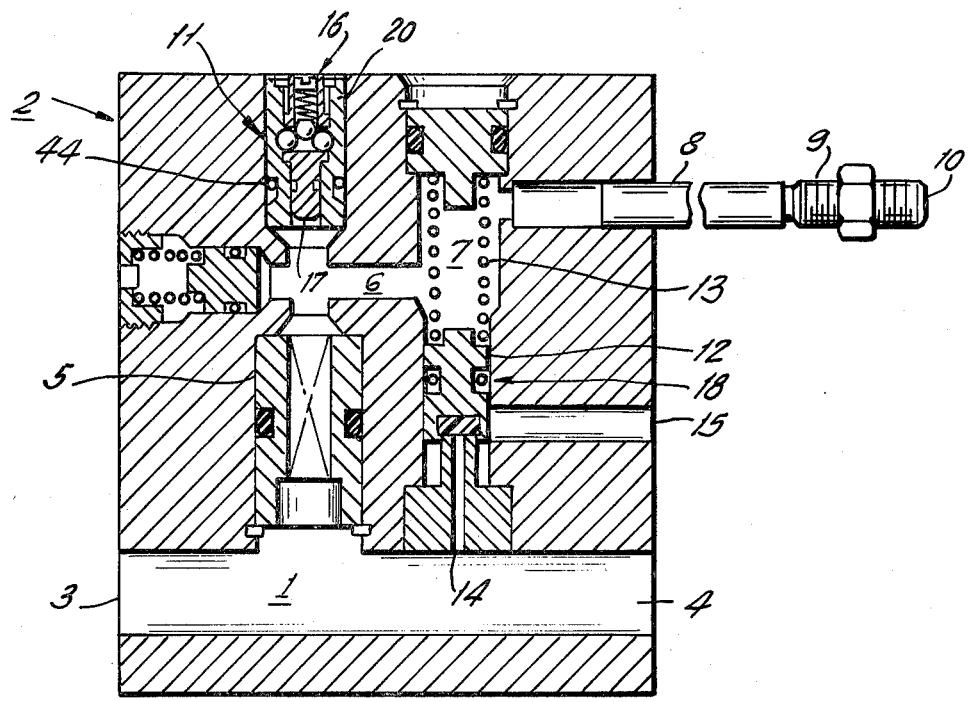
FIG. 1 is a cross-sectional view illustrating a proportioning block of a lubricant distribution system such as that described in U.S. Pat. No. 3,730,297, and fitted with the valve of the invention.

Referring to FIG. 1, a proportioning block 2 for a lubricant distributing system is illustrated. A main pressure line from a source of lubricant (not shown) passes through the main pressure line portion 1 of the block 2, from inlet 3 through outlet 4. The normal flow path through block 2 of an apportioned share of liquid from the main pressure line is from inlet 3 through primary control fitting 5 which causes a first pressure drop, through pressure sensing conduit 6, secondary sensing conduit 7, branch pressure line portion 8, through secondary control fitting 9 which causes a second pressure drop, through outlet 10 at the end of line 8 and into a branch line (not shown).

Conduit 6 also communicates with secondary valve 11 according to the invention. Valve 11 includes means that pop open the valve 11 upon a predetermined increase in the pressure in conduit 6. When valve 11 pops open, it causes a drop in the pressure of conduit 6 because the open valve permits leakage of liquid from conduit 6. This pressure drop permits the piston 12 in conduit 7 to shift, against the force of spring 13 exerted at one side of piston 12, under the pressure in main line 1 which communicates through passage 14 with the other side of piston 12. Such shifting permits leakage flow of fluid from main pressure line 1, through conduit 14 through outlet passage 15. Such leakage indicates that excess pressure has developed in conduit 6, as might occur if a malfunction develops in secondary fitting 9.

The secondary valve 11 of the invention includes a piston 16, the end surface 17 of which is in fluid communication directly with pressure conduit 6. Since the indication of an overpressure condition in conduit 6 is triggered by the shifting of piston 16, piston 16 should be held relatively stationary until an excess pressure condition develops sufficient to cause the piston to shift. The valve mechanism 11 illustrated in FIGS. 2-5 is designed to maintain piston 16 relatively stationary to keep valve 11 sealed closed until there is excess pressure in conduit 6.

Figure 2:
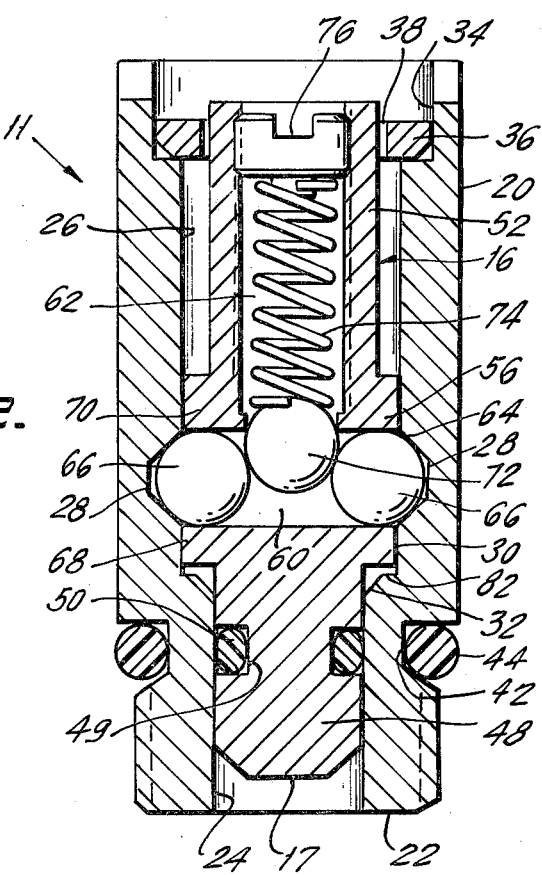
FIG. 2 is an enlarged view of a portion of FIG. 1 illustrating the valve in greater detail.

Referring to FIG. 2, the valve 11 illustrated there is comprised of the piston 16 and the cylinder 20. The cylinder 20 is an integral rigid metal tube which is bored through with a bore having various width and shape characteristics along its length. Starting at the end 22 of the cylinder 20, the cylinder 20 has a bore section 24 that is of a relatively narrower diameter. The other end of the bore through cylinder 20 comprises the greater width or diameter section 26. Toward the end of the bore section 26 near the bore section 24, an annular detent recess 28 is defined. The side walls of recess 28 are chamfered to aid the below described detent balls in moving into and out of the recesses as the piston 16 shifts. The section 26 of the cylinder bore continues in a short length section 30 for receiving a wider section of the piston 16 as described below. The section 30 of the bore through the cylinder 20 merges into the section 24 of the same bore through the intermediate tapered section 32. This taper is provided for guiding the motion of the O-ring seal 50 on the piston 16, as described below.

The other end of the bore section 26 of the cylinder 20 terminates in a still wider section 34. An annular stop ring 36 is positioned at the junction between bore sections 26 and 34 and is held securely in place in the bore section 34. The stop ring 36 is comprised of resilient material so as to stop and absorb the impact of the shifting of the piston 16 once it has been freed to move, as described below. The opening 38 through the annular ring 36 is of a diameter slightly greater than the diameter of the main body of the piston 16, thereby to permit leakage flow of liquid once the piston has shifted to permit such flow.

An annular groove 42 extends around the exterior of cylinder 20 for receiving the O-ring 44 therein. When the valve 11 is inserted in the block 2, the O-ring 44 seals this connection to prevent any leakage from the conduit 6 past the exterior of the cylinder 20.

The piston 16 has a number of sections corresponding to the different bore sections in the cylinder 20. As shown in FIG. 2, the piston section 48 is sealingly positioned in the cylinder bore section 22.

Piston section 48 has the piston surface 17 at one end thereof. The external diameter of the piston section 48 corresponds to the internal diameter of the bore section 24 so that when the piston section 48 is in the bore section 24, there is an effective liquid sealing fit between them. An annular groove 49 is defined around the piston section 48 intermediate its length. Positioned in the groove 49 is the sealing O-ring 50 comprised of a resilient rubber, plastic, or the like material which will securely liquid tight seal the piston section 48 in the cylinder bore section 24 while permitting sliding of the piston through the cylinder. The placement of the annular groove 49 along the section 24 is selected so that, as shown in FIG. 3, while the below described detent balls 66 are being forced out of the cylinder recess 28, the full pressure in conduit 6 is pushing on the piston 16. Obviously, if leakage were permitted past the piston section 48 during the initial shifting of the piston to remove the detent balls from the cylinder recess therefor, there would be less force available for shifting the detent balls out of the recess, and this would interfere with the efficient operation of the valve.

Note that the diameter of the piston section 48 is less than that of the cylinder bore section 26 so that when the piston is in the open condition of FIG. 4, a free flow pathway is defined for liquid past the piston section 48 while that piston section is in the cylinder section 26.

The section 52 of the piston 16 inside the cylinder section 26 has a smaller diameter than the cylinder section 26 and thereby provides a clear flow passageway past that section of the piston 52. Further, the diameter of the piston section 52 is smaller than the internal diameter of the stop ring 36 to permit leakage flow through the annular passageway 38. The central portion 56 of the piston 16 is of a non-circular cross-section, as shown in FIG. 5, and includes circular sector portions 58 which are of the same diameter as the cylinder sections 26, 30 and flats 61. Once the piston section 48 is unsealed with respect to the cylinder bore section 24, leakage flow past the flats 61 of the piston occurs.

Starting at the piston section 56 intermediate the length of the piston 16, a T-shaped passageway is formed at the intersection of transverse bore 60 and longitudinal bore 62 which extend through piston section 52. The transverse bore 60 defines two radially outwardly facing detent element receiving openings 64, each for receiving a respective detent element, i.e. a ball 66. The longitudinal length of cylinder recess 28 is the same as the diameter of the bore 60 which holds the piston steadier in the cylinder through the detent means described below.

The piston section 56 is divided into the longitudinal sections 68 and 70 on the opposite sides of transverse bore 60. Both of these sections are shaped as in FIG. 5, including the flats 61 that permit leakage flow through the cylinder.

A pair of detent element balls 66 are respectively placed in the bore openings 64. Balls 66 are of the diameter of bore 60. Each ball 66 can be registered with the chamfered cylinder recess 28. The piston 16 and cylinder 20 are longitudinally positionable to register the chamfered recess 28 with the bore 60 to permit the detent balls 66 to rest partially outside the circumference of the piston and within recess 28, as shown in FIG. 2.

A biasing element, a third ball 72, is interposed between the detent balls 66 at the transverse bore 60. Biasing ball 72 is also in the longitudinal piston bore 62. A normally compressed biasing spring 74 is housed in the longitudinal bore 62 of the T-shaped passageway. The biasing ball 72 seats on one end of the spring 74. The end of the bore 62 that is away from bore 60 is closed off by a biasing spring calibration screw 76. The other end of the spring 74 seats upon the calibration screw 76. Adjustment of the calibration screw 76 adjusts the biasing force that may be exerted by the spring 74 against the biasing ball 72. The diameter of the biasing ball 72 is related to the diameter of the bore 60 and the diameters of the balls 66 such that with the recess 28 in registry with the bore 60, the biasing ball 72 is longitudinally offset from the balls 66 along the length of piston 16 and on the side of the balls 66 toward screw 76.

With the piston in the position of FIG. 2, when the bore 60 and recess 28 are in registry, the pressure exerted by the spring 74 against the biasing ball 72 urges the detent balls 66 outwardly into the cylinder recess 28, thus inhibiting free movement of the piston 16 through the cylinder 20.

Referring to FIG. 3, when the pressure in conduit 6 applied to the piston 16 at its surface 17 exceeds the preset calibratable pressure applied by spring 74 to the pair of detent balls 66, the balls 66 begin to move out of chamfered recess 28 and are driven radially toward each other which drives biasing ball 72 longitudinally and compresses spring 24. As it is a spring that holds balls 66 in recess 28, balls 22 slowly creep out of recess 28 with even minor pressure changes. But, it is not until the preset pressure is attained that the balls are fully forced from recess 28. During the movement illustrated in FIG. 3, it is significant that the piston section 48 and its O-ring sealing element 50 are still sealing cylinder section 24 whereby the full force of the pressure in conduit 6 is moving piston 16.

Referring to FIG. 4, once the balls 66 have been forced completely outside the cylinder recess 20 and into bore 60, compression of spring 74 is halted. The piston 16 is now freed to move along its longitudinal axis through cylinder 19. Nothing is obstructing such movement, whereby the piston pops out of the cylinder through stop ring 27. Finally, the widened piston section 70 abuts the resilient stop ring 27 at the end section 34 of cylinder 20. At this point, the calibration screw 25 and a portion of the piston 16 extend beyond the end of the cylinder 19 and indicate that the valve has opened. Further, the piston section 48 is no longer sealing the cylinder, whereby leakage flow through passage 38 indicates the valve has opened.

The valve is reset by manually depressing the projecting end of the piston to return the detent balls 66 to their initial position in the recess 28. The piston section 48 moves into the cylinder section 24 and the O-ring 50 is squeezed by the tapered cylinder wall section 32 as the O-ring 50 moves into the cylinder section 24. Finally, the piston section 68 abuts the step 82 in the bore section 30 which assures return motion of the piston 16 only to the desired extent and leaves the balls 66 in the cylinder recess 28.

There has just been described a bistable hydraulic valve adaptable for use in a liquid distribution system and which is capable of both relieving pressure and of indicating excess pressure in the system with which the valve communicates. The valve is calibratable and reusable.

Although this invention has been described in connection with a preferred embodiment, it should be understood that many variations and modifications will now become apparent to those skilled in the art. It is preferred, therefore, that the scope of the invention be limited, not by the specific disclosure herein, but only by the appended claims.

What is claimed is:

1. A pressure responsive valve, comprising:
a cylinder having a longitudinally extending bore therethrough; one end of said cylinder bore being connectable to a pressure source;
a piston in said cylinder bore and movable therethrough;
detent means for retaining said piston at a predetermined longitudinal position along said cylinder bore; said detent means comprising:
a detent element on said piston; a detent receiving recess in said cylinder bore; said detent element being shaped to be received in said recess while said detent element is also on said piston; a radially extending bore in said piston, in which said detent element is supported; said radially extending bore being registrable with said cylinder recess upon shifting of said piston to said predetermined longitudinal position; said detent element being in said radially extending bore at all times including when it is also in said recess;
a biasing element on and movable along with said piston; said biasing element being movable along a longitudinally extending axis of and with respect to said piston; said biasing element also being in engagement with said detent element and said biasing element normally urging said detent element radially outwardly of said radially extending bore and in a direction into said recess; said detent element being normally offset from said biasing element axis of longitudinal motion; said detent element and said biasing element both being respectively so shaped that longitudinal motion of said biasing element translates into radial motion of said detent element into and out of said recess, and radial motion of said detent element translates into longitudinal motion of said biasing element;
biasing means connected with said biasing element for normally urging said biasing element to move longitudinally with respect to said piston to contact said detent element and to urge said detent element into said recess; said biasing element and said detent element being placed to charge said biasing element as said detent element is moved out of said recess.

2. The pressure responsive valve of claim 1, wherein said radially extending bore comprises a transverse bore across the entire said piston, with two opposite outlet openings from said transverse bore to the outside of said piston; a respective said detent element at each said transverse bore outlet opening; said piston, said detent elements and said biasing element all being so shaped that said biasing element simultaneously urges both said detent elements radially outwardly into said recess.

3. The pressure responsive valve of claim 1, further comprising a longitudinally extending bore in said piston and intersecting said radially extending bore; said biasing means being a spring in said longitudinally extending piston bore; said biasing element being in engagement with said spring; said spring being compressed and charged as said biasing element is pushed into said longitudinally extending piston bore.

4. The pressure responsive valve of claim 3, wherein said radially extending bore comprises a transverse bore across the entire said piston, with two opposite outlet openings from said transverse bore to the outside of said piston; a respective said detent element at each said transverse bore outlet; said piston, said detent elements and said biasing element all being so shaped that said biasing element simultaneously urges both said detent elements radially outwardly into said recess.

5. The pressure responsive valve of claim 4, wherein said cylinder bore is defined by the internal walls of said cylinder; said cylinder bore has a narrower width section at the one longitudinal side thereof with respect to said cylinder recess that communicates with a pressure source, and said cylinder bore having a greater width section at the other longitudinal side thereof with respect to said cylinder recess;
said piston having a first section at one longitudinal side of said detent element; said piston first section being adapted to sealingly fit into said cylinder bore narrower width section; said piston first section being of a longitudinal length such that when said detent element is in said recess and just after said detent element has left said recess under pressure from a pressure source, said piston first section is in said cylinder bore narrower width section, and as said piston moves freely under pressure from the pressure source away from said one end of said cylinder bore, said piston first section moves out of said cylinder bore narrower width section and terminates the sealing of said cylinder bore by said piston first section sealing in said cylinder bore narrower width section.

6. The pressure responsive valve of claim 5, wherein said piston includes a second section, which does not enter said cylinder narrower width section and which has a width dimension less than the width of said cylinder greater width section, whereby a flow path past said piston second section in said cylinder exists; with said piston first section out of said cylinder bore narrower width section, a free flow path through said cylinder past said piston first and second sections is created.

7. The pressure responsive valve of claim 6, further comprising a flow passage at the end of said cylinder that is opposite the said cylinder end which is connectable to a pressure source.

8. The pressure responsive valve of claim 6, further comprising a sealing ring around said piston first section and engaging said walls of said cylinder bore narrower width section for assuring the seal of said piston first section in said cylinder bore narrower width section; said sealing ring being so placed longitudinally along said piston first section as to be in said cylinder bore narrower width section when said detent element is in said recess and just after said detent element has been moved out of said recess under the influence of pressure from the pressure source, and said sealing ring being so placed longitudinally along said piston first section as to be out of said cylinder bore narrower width section when said detent element has moved with said piston through said cylinder away from said end of said cylinder bore under the influence of pressure from a pressure source connected to said end of said cylinder.

9. The pressure responsive valve of claim 4, wherein said detent elements are in the shape of a ball.

10. The pressure responsive valve of claim 9, wherein said biasing element is in the shape of a ball.

11. The pressure responsive valve of claim 4, further comprising abutment means in said cylinder bore for limiting the extent of longitudinal motion of said piston through said cylinder bore, once said detent elements are out of said recess.

12. The pressure responsive valve of claim 4, wherein said longitudinally extending piston bore extends away from said radially extending bore and away from said one end of said cylinder.

13. The pressure responsive valve of claim 12, further comprising means for calibrating the biasing force exerted by said biasing means.

14. The pressure responsive valve of claim 4, further comprising means for calibrating the biasing force exerted by said biasing means; said calibrating means comprising a calibrating screw at the exterior of said piston for adjusting the compression of said spring; said longitudinally extending piston bore and said spring both extending to said calibrating screw.

15. A pressure responsive valve, comprising:
a cylinder having a longitudinally extending bore therethrough; one end of said cylinder bore being connectable to a pressure source;
a piston in said cylinder bore and movable therethrough;
detent means for retaining said piston at a predetermined longitudinal position along said cylinder bore; said detent means comprising:
a first detent element on said piston and a cooperating second detent element in said cylinder bore; said piston being movable through said cylinder so as to engage and disengage said first and said second detent elements;
said cylinder bore is defined by the internal walls of said cylinder; said cylinder bore has a narrower width section at the one longitudinal side thereof with respect to said second detent element that communicates with a pressure source, and said cylinder bore having a greater width section at the other longitudinal side thereof with respect to said second detent element;
said piston having a first section at one longitudinal side of said detent element; said piston first section being adapted to sealingly fit into said cylinder bore narrower width section; said piston first section being of a longitudinal length such that when said first and second detent elements are in engagement and just after said first and second detent elements have disengaged under pressure from a pressure source, said piston first section is in said cylinder bore narrower width section, and as said piston moves freely under pressure from the pressure source away from said one end of said cylinder bore, said piston first section moves out of said cylinder bore narrower width section and terminates the sealing of said cylinder bore narrower width section;
said piston includes a second section, which does not enter said cylinder narrower width section and which has a width dimension less than the width of said cylinder greater width section, whereby a flow path past said piston second section in said cylinder exists; with said piston first section out of said cylinder bore narrower width section, a free flow path through said cylinder past said piston first and second sections is created; a flow passage at the end of said cylinder that is opposite the said cylinder end which is connectable to a pressure source.

16. The pressure responsive valve of claim 15, further comprising a sealing ring around said piston first section and engaging said walls of said cylinder bore narrower width section for assuring the seal of said piston first section in said cylinder bore narrower width section; said sealing ring being so placed longitudinally along said piston first section as to be in said cylinder bore narrower width section when said detent element is in said recess and just after said detent element has been moved out of said recess under the influence of pressure from the pressure source, and said sealing ring being so placed longitudinally along said piston first section as to be out of said cylinder bore narrower width section when said detent element has moved with said piston through said cylinder away from said end of said cylinder bore under the influence of pressure from a pressure source connected to said end of said cylinder.

* * * * *